United States Patent
Perla et al.

(10) Patent No.: US 8,184,540 B1
(45) Date of Patent: May 22, 2012

(54) PACKET LIFETIME-BASED MEMORY ALLOCATION

(75) Inventors: Srinivas Perla, San Jose, CA (US); David J. Ofelt, Los Gatos, CA (US); Jon Losee, Larkspur, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 343 days.

(21) Appl. No.: 12/636,483

(22) Filed: Dec. 11, 2009

(51) Int. Cl.
*G01R 31/08* (2006.01)
(52) U.S. Cl. ......... 370/235; 370/412; 370/428; 709/225
(58) Field of Classification Search .................. None
See application file for complete search history.

(56) References Cited

U.S. PATENT DOCUMENTS

| 6,426,943 | B1 * | 7/2002 | Spinney et al. | 370/235 |
| 7,756,977 | B2 * | 7/2010 | Yong et al. | 709/225 |

* cited by examiner

*Primary Examiner* — Donald Mills
*Assistant Examiner* — Wanda Russell
(74) *Attorney, Agent, or Firm* — Shumaker & Sieffert, P.A.

(57) ABSTRACT

A lifetime-based memory management scheme is described, whereby a network device first determines an expected lifetime for received packets, which correlates to the expected output queue latency time of the packets. The network device then buffers packets having matching lifetimes to memory pages dedicated to that lifetime.

27 Claims, 7 Drawing Sheets

PACKET LIFETIME-BASED MEMORY ALLOCATION

TECHNICAL FIELD

The invention relates to computer networks and, more particularly, to memory allocation for packets within network devices.

BACKGROUND

In general, a network device sends and receives network packets that have widely varying characteristics and functions. For example, certain packets contain network management control information, while others may carry content for a real-time application, such as streaming video or Voice-over-IP (VoIP) telephony. In addition, packets from active network flows tend to arrive at network devices in unpredictable bursts, requiring a substantial buffering capability on the part of a network device to accommodate the packet influx.

Because the amount and types of network traffic being transmitted, analyzed, routed, and filtered by computer networks continues to grow, many networks offer quality of service (QoS) guarantees beyond best-effort service in order to assure a certain level of performance. For example, a network may guarantee a certain maximum delay from a particular source to a particular destination. As another example, a network provider may promise to provide a guaranteed level of bandwidth to a particular node, e.g., customer, or for certain packet flows. These QoS guarantees are often grouped into priority levels, with each priority level providing a different level of service.

Typically, a network device offering QoS guarantees contains a number of priority queues corresponding to the different priority levels. As packets are received by the network device, they are analyzed and classified according to their priority. Each packet is then assigned to one of the many priority queues within the network device, where the packet is then buffered in order to await processing. The network device processes the packets in the priority queues in such a manner as to achieve the requisite level of service for the requirements specified by the corresponding QoS guarantee.

Outbound interfaces of the network device may be associated with priority queue sets dedicated to those interfaces. The network device assigns arriving packets destined for a particular destination to the priority queue set for the appropriate outbound interface according to the priority level of the packet. This, in addition to the bursty nature of many packet flows, results in individual queue latencies that are highly variable according to associated interface, priority, and time.

SUMMARY

In general, the invention is directed to techniques for assigning packets to portions of the packet buffer memory in such a manner as to reduce internal memory fragmentation and increase memory allocation efficiency. For example, techniques are described by which a router matches packets having similar expected queue latencies and assigns such packets to designated memory pages even though the packets may belong to different packet queues.

In accordance with the techniques described herein, the router implements a lifetime-based memory management scheme, whereby the router first determines an expected lifetime value for received packets, which represents the expected output latency time of the packets. The router then uses these values to buffer packets having dissimilar expected lifetimes to different pages and, conversely, to buffer packets having similar expected lifetimes to the same pages.

In one embodiment, the invention is directed to a method for receiving an incoming network packet with a network device and assigning, with the network device, the network packet to a first one of a plurality of lifetimes maintained by the network device, wherein each lifetime in the plurality of lifetimes defines a different subrange within a range of possible output queue latencies for a plurality of output queues of the network device. The method further comprises buffering the network packet to a first one of a plurality of memory pages based on the first lifetime to which the network packet was assigned, wherein each of the plurality of memory pages comprises a block of contiguous memory address space of the network device.

In another embodiment, the invention is directed to a router comprising a plurality of output queues, a plurality of memory pages wherein each of the plurality of memory pages comprises a block of contiguous memory address space, and a plurality of lifetimes, wherein each lifetime in the plurality of lifetimes defines a different subrange within a range of possible output queue latencies for the plurality of output queues. The router further comprises an interface that receives an incoming network packet and a memory manager, wherein the memory manager assigns the network packet to a first one of the plurality of lifetimes, and wherein the memory manager buffers the network packet to a first one of a plurality of memory pages based on the first lifetime to which the network packet was assigned.

In another embodiment, the invention is directed to a computer-readable medium containing instructions. The instructions cause a programmable processor to receive, with a network device, an incoming network packet and assign, with the network device, the network packet to a first one of a plurality of lifetimes maintained by the network device, wherein each lifetime in the plurality of lifetimes defines a different subrange within a range of possible output queue latencies for a plurality of output queues of the network device. The instructions further cause the programmable processor to buffer the network packet to a first one of a plurality of memory pages based on the first lifetime to which the network packet was assigned, wherein each of the plurality of memory pages comprises a block of contiguous memory address space of the network device.

The techniques described herein may present several advantages. For instance, buffering packets having similar expected lifetimes to the same pages increases the probability that packets allocated to the same page will have similar transmission times. That is, the techniques tend to decrease, for a single page, the standard deviation of the distribution representing the likely differences between transmission times for packets on the page. The time for which the unused space (caused by prior transmission of packets having lower latency than remaining packets in the page) must be retained decreases accordingly, and, as a result, pages may be deallocated more efficiently, leading to better utilization of allocated pages and an accompanying increase in the number of packets that may be simultaneously held in packet buffer memory.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
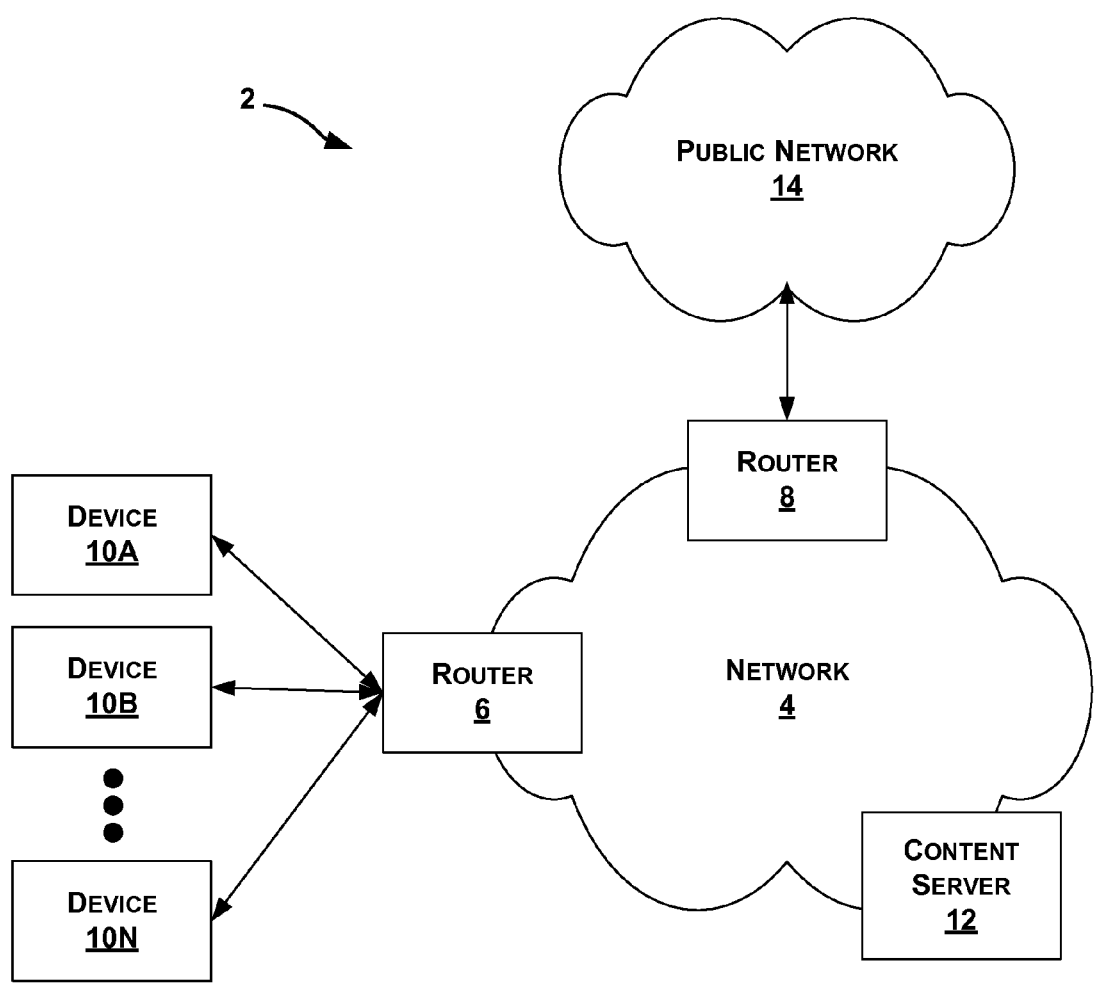
FIG. 1 is a block diagram illustrating an exemplary computer network in which a router receives and transmits network traffic.

FIG. 1 is a block diagram illustrating an exemplary system 2 in which network 4 includes router 6. Devices 10A-10N (collectively, devices 10) connect to network 4 via router 6 in order to access resources provided by network 4. Each of devices 10 may be an end-user computing device, such as a personal computer, a laptop computer, a mobile telephone, a network telephone, a television set-top box, a video game system, a point-of-sale device, a personal digital assistant, an intermediate network device, a network appliance, a supercomputer, a mainframe computer, an industrial robot, or another type of device capable of interfacing with and communicating over network 4.

Network 4 may include a plurality of network devices that facilitates the access of content by devices 10. Each of the plurality of network devices may comprise one of a router, a switch, a server, a database server, a hub, a firewall, an intrusion detection/prevention (IDP) device and/or any other type of networking equipment or device that facilitates the transfer of data to and from devices 10. Network 4 includes router 6 and router 8, which communicate using various protocols, such as the Border Gateway Protocol and the Internet Control Message Protocol, in order to exchange routing, network configuration information, and other information. The network may be a local area network ("LAN"), such as a token ring or Ethernet network, a virtual local area network ("VLAN"), or another type of network. The network may comprise one or more wired or wireless links For example, network 4 may be an Ethernet network that comprises one or more Ethernet cables. In another example, the network may be a Wireless Fidelity ("Wi-Fi") network that uses wireless radio transmissions to communicate information. In another example, network 4 may be a mobile network. Although shown as a single network 4 in FIG. 1, network 4 may comprise any number of interconnected networks, either public or private, in which the various networks interconnect to form one or more virtual networks.

Network 4 provides a variety of resources that may be accessed by devices 10. In the example of FIG. 1, network 4 includes content server 12 that stores or otherwise sources content, which, as the term is used herein, refers to any data commonly transmitted and/or stored within a network, such as web-based applications, images, documents, web pages, video data, audio data such as voice, web-based games, scripts, or any other type of network-based content. Network 4 may support multicast techniques to improve the delivery efficiency of data transmitted with the network. Typically network 4 will also connect to a variety of other types of devices (e.g., file servers, printers, telephones, and e-mail and other application servers). Network 4 is also shown coupled to public network 14 (e.g., the Internet) via router 8. Public network 14 may include, for example, one or more client computing devices. Public network 14 may provide access to web servers, application servers, public databases, media servers, end-user devices, and many other types of network resource devices and content.

Network 4 may transmit content to devices 10 through router 6 using one or more packet-based protocols, such as an Internet Protocol (IP)/Transmission Control Protocol (TCP). In this respect, network 4 may support the transmission of data via discrete data units, often referred to as "packets." As a result, network 4 may be referred to as a "packet-based" or "packet switched" network. While described in this disclosure as transmitting, conveying, or otherwise supporting packets, network 4 may transmit data according to any other discrete data unit defined by any other protocol, such as a cell defined by the Asynchronous Transfer Mode (ATM) protocol, or a datagram defined by the User Datagram Protocol (UDP).

Network traffic delivered by network 4 may be classified according to a number of categories. For instance, content server 12 may stream live video to one of devices 10 through router 6. Packets that transmit such video may be classified as streaming multimedia packets. Content server 12 may also send web pages to one of devices 10 using HTTP packets. As another example, information exchanged by routers 6 and 8 may be categorized as network management traffic. In addition to being classified by application, network traffic may be classified by source or destination, user, protocol, and port (for TCP and UDP), among others characteristics.

Various categories of network traffic may require a certain level of network performance. For example, streaming multimedia may require guaranteed bandwidth to provide an acceptable user experience. As another example, network management traffic should experience low delays in order to maintain the efficiency of a network. Also, internet service providers (ISPs) may prioritize traffic for certain users over others based on a service provider agreement. To meet these requirements, network 4 includes mechanisms to support quality of service (QoS) guarantees according to a number of predefined QoS levels.

Router 6 receives, analyzes, and classifies packets to assign the packets to a suitable priority level. In addition to classifying packets, router 6 processes the received and classified packets according to their priority level. In this manner, router 6 implements aspects of the QoS guarantees provided by network 4. In addition, based on information received from other devices in system 2, router 6 determines the appropriate route through the system for each received packet and forwards the packet accordingly.

Router 6 supports the invention described herein in order to improve memory utilization within the router when performing the packet routing and forwarding functions described above. For example, as further described below, router 6 partitions the packet memory buffer into a number of pages. An individual page is allocated from a memory page free store to store one or more packets and the page is deallocated once all packets stored by the page are transmitted and therefore no longer need to be held. When buffering packets, the router assigns packets having similar expected output latencies to the same pages for storage. Packets held by a particular page therefore tend to have similar transmission times. As a result, the unused space caused by a prior transmission of a packet that shares a memory page with one or more other packets is deallocated, along with the page itself, more rapidly due to the timely transmission of the other packets stored by the page.

For example, router 6 may have a large but finite amount of packet buffer memory that the router partitions into a number of fixed-length blocks called pages. The lifetime-based memory management scheme of router 6 avoids potential inefficiencies of conventional systems in which a single page may store multiple packets having varying characteristics. As one example, the lifetime-based memory management scheme may avoid storing both high-priority and low-priority packets on the same page. In another example, the lifetime-based memory management scheme may avoid storing packets on the same page when one packet is destined for an output interface having a light traffic load while another packet stored by the same page is destined for a different output interface experiencing relatively heavy traffic. In both of these examples, the multiple packets have dissimilar latencies that cause the packets to be transmitted by the router at different times. As a result, the lifetime-based memory management scheme described herein avoids a packet buffer becoming internally fragmented as the low-latency packets are transmitted and the high-latency packets linger, which would otherwise prevent router 6 from deallocating the page for reuse in buffering additional packets.

Although the principles of this invention are described with respect to a router, they are applicable to other network devices that perform packet forwarding or similar functions. For example, the invention may be applied to an ATM switch, a LAN switch, an interface card, a gateway, a firewall, or many other types of devices.

Figure 2:
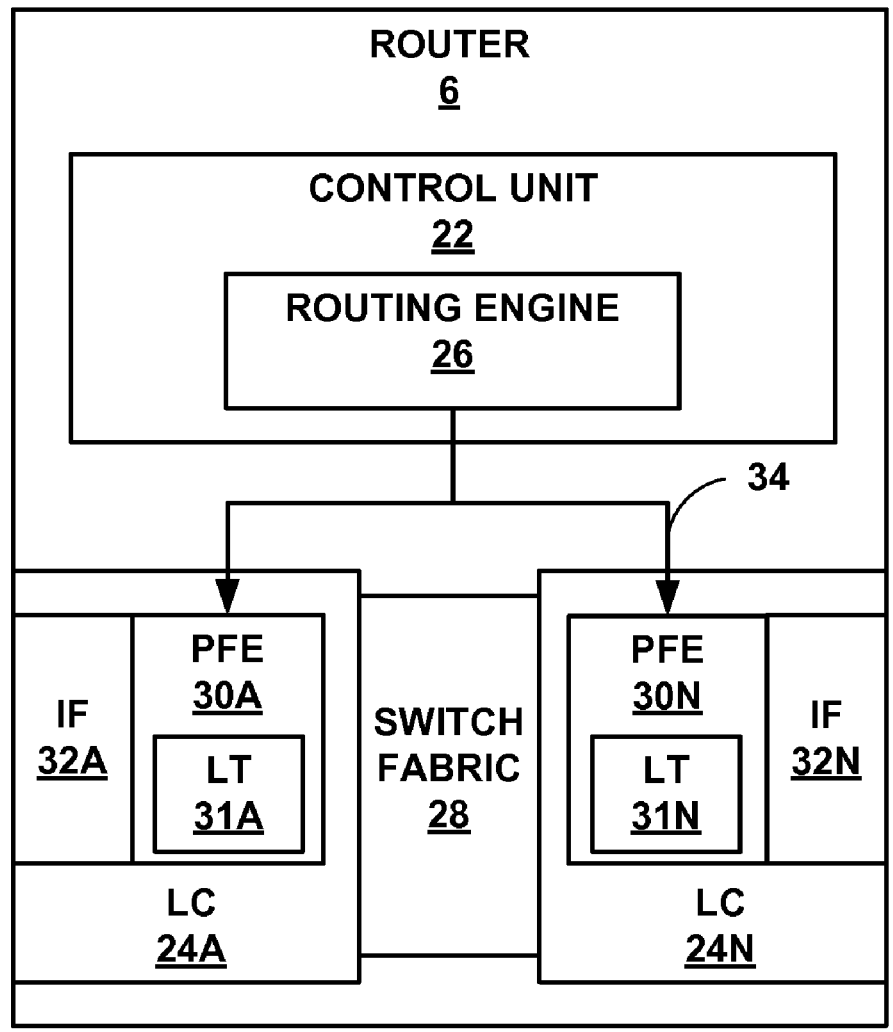
FIG. 2 is a block diagram illustrating an exemplary embodiment of a router consistent with the principles of the invention.

FIG. 2 is a block diagram illustrating router 6 of FIG. 1 in further detail. Router 6 routes data packets between the network devices of system 2 of FIG. 1 and includes a control unit 22 that manages the routing processes. Control unit 22 includes routing engine 26, which maintains routing information describing the topology of the network and the reachability of other network devices in system 2. Routing engine 26 may run various interior routing protocols such as the Routing Information Protocol (RIP) or Open Shortest Path First (OSPF) to maintain an accurate description of the topology of network 4. In addition, routing engine 26 may run exterior routing protocols such as the Border Gateway Protocol (BGP) to exchange exterior route information with router 8. The routing information may include route data that describes various routes through the network as well as next hop data indicating appropriate neighboring devices within the network for each of the routes.

In some embodiments, router 6 implements the multicast techniques provided by network 4. In such instances, router 6 communicates with other nodes in network 4 using, for example, Protocol Independent Multicast (PIM) to construct multicast distribution trees for multicast groups. Router 6 may maintain state information for multicast distribution trees of which router 6 is a node. The state information provides information specifying, for example, the destination addresses of member nodes of a multicast group that are downstream from router 6.

In this example, router 6 further includes one or more line cards 24 ("LC 24A-N"). A line card 24 may be, for instance, a dense port concentrator (DPC) and includes one or more packet forwarding engines 30 ("PFEs 30") as well as a physical interface 32 ("IFs 32"). A physical interface 32 may include one or more physical interface cards (not shown) for connecting the associated line card 24 to physical media (e.g., an Ethernet cable or synchronous optical networking (SONET) link). Switch fabric 28 provides an interconnect path between line cards 24 and, correspondingly, IFs 32 of router 6. Switch fabric 28 may comprise, for example, a switch fabric, switchgear, a configurable network switch or hub, or other high-speed switching mechanisms.

Routing engine 26 is communicatively coupled to PFEs 30 via communication links 34. Routing engine 26 exchanges packets with and downloads forwarding information to PFEs 30. Communication links 34 may be a shared bus, dedicated cables or lines, a backplane, or other connection.

Router 6 includes hardware, firmware and/or software, and may include discrete hardware circuitry such as application-specific integrated circuits (ASICs), as well as processors, control units, or other logic for executing instructions fetched from computer-readable media. Examples of such media include hard disks, flash memory, random access memory (RAM), read-only memory (ROM), non-volatile random access memory (NVRAM), electrically erasable programmable read-only memory (EEPROM), flash memory, and the like. A router 6 may distribute all or only a portion of the forwarding processing logic to PFEs 30.

PFEs 30 perform both layer 2 and layer 3 functions including switching, route lookup, and packet forwarding for router 6. Upon receiving a packet from the associated one of IFs 32, a receiving one of PFEs 30 determines the appropriate output port on one of IFs 32 of itself or a different one of PFEs 30 for the packet by consulting a forwarding table derived from routing information. The forwarding table associates next hop interfaces (i.e., IFs 32 coupled to physical communication links) with particular network destinations and, more specifically, next hops (neighbor devices) for reaching those destinations. In instances where the outbound PFE 30 is different than the receiving PFE 30, the receiving PFE 30 directs the packet across switch fabric 28 to the outbound PFE 30. Otherwise, the packet remains with the receiving PFE 30, which is also the outbound PFE 30.

Outbound packets frequently arrive at the outbound one of PFEs 30 in bursts that exceed the capacity of the PFE to output the packets on corresponding interface 32 in real-time. In order to mitigate packet discard, the outbound PFE 30 buffers outbound packets until such time as interface 32 has capacity to transmit the packets. In accordance with the lifetime-based memory management scheme described herein, each of PFEs 30 comprises an associated one of packet lifetime-based memory managers 31A-31N (illustrated and referred to hereinafter as "LTs 31"). LTs 31 perform the outbound packet buffering operations of PFE 30 by assigning outbound packets to one of a number of lifetimes based on a determination, by LTs 31, of the expected output latencies for the packets. In addition, each of LTs 31 buffers outbound packets having the same assigned lifetime to memory pages that the LT has assigned to that lifetime. Each allocated memory page therefore stores outbound packets having similar output latencies, resulting in an accompanying avoidance of internal memory fragmentation and improved utilization of the memory space by PFEs 30.

In some embodiments, router 6 implements virtual output queuing (VOQ). In such embodiments, the receiving (or, "ingress") one of PFEs 30 performs the buffering techniques described above for received packets. In such embodiments, the output queues comprise a set of virtual output queues mapped to other ones of PFEs 30.

Figure 3:
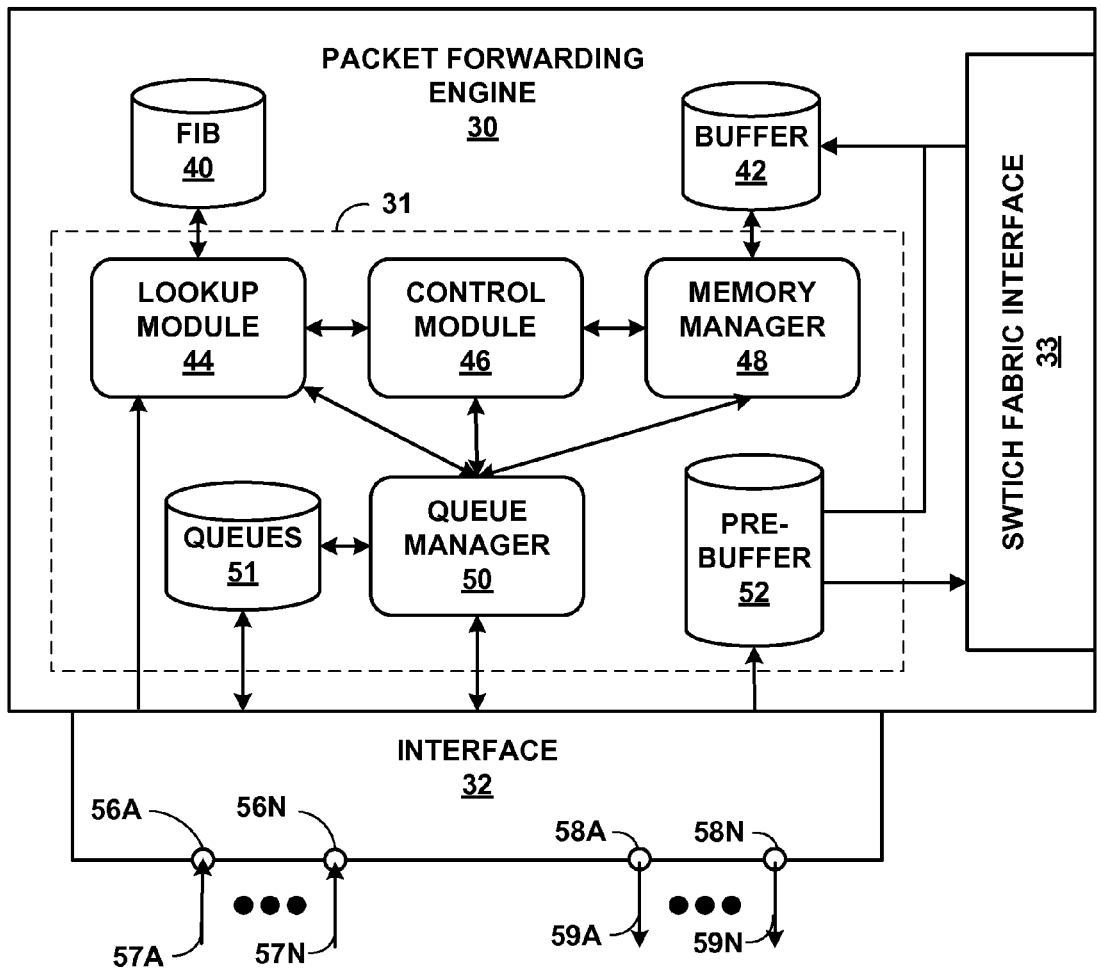
FIG. 3 is a block diagram illustrating, in further detail, a packet forwarding engine that implements the principles of the invention.

FIG. 3 is a block diagram illustrating, in greater detail, an example architecture of one of packet forwarding engines 30 that comprises a packet lifetime-based memory manager 48, and further illustrating a corresponding one of interfaces 32 of the exemplary router of FIG. 2. Interface 32 includes input ports 56A-56N (collectively, incoming ports 56) and output ports 58A-58N (collectively, output ports 58). Output ports 58 and input ports 56 couple PFE 30 to other network devices via outbound network links 59A-59N and inbound network links 57A-57N, respectively. Output ports 58 and input ports 56 provide the physical interface for interface 32 by which PFE 30 exchanges network packets with the coupled network devices.

In the example of FIG. 3, PFE 30 includes switch fabric interface 33, pre-buffer 52, lookup module 44, and forwarding information base 40 ("FIB 40"). Switch fabric interface 33 provides an interface to switch fabric 28 that allows PFE 30 to exchange commands and data with other PFEs on router 6. Pre-buffer 52 serves as temporary intake storage for packets received on one of input ports 56. In one example, pre-buffer 52 is allocated within on-chip static RAM (SRAM) but may be another type of storage media. In some embodiments, pre-buffer 52 is distributed to interface 32. When interface 32 receives a packet, interface 32 strips the packet of its layer 2 header. Interface 32 divides the remaining layer 3 packet into its component payload and header aspects and sends the packet payload to pre-buffer 52 for temporary storage. The packet header includes the destination address for the packet.

FIB 40 comprises forwarding information to control the forwarding of packets by router 6. As one example, FIB 40 includes forwarding entries for destination network devices having specific destination Internet Protocol (IP) addresses. As one example, FIB 40 is organized as a radix tree that maps a particular destination address to a next hop and ultimately to one or more output ports on one of line cards 24 of router 6. For example, an entry in FIB 40 may map the destination address for device 10A of system 2, having destination address $D_1$, to output port 58A. As another example, the forwarding information of FIB 40 may map MPLS labels, VLAN tags, or any other type of keying information that can be obtained from a packet or other data unit and used to map the packet to an appropriate next hop.

Lookup module 44 determines, for a particular packet, the appropriate output port for the packet on router 6 and classifies packets to a suitable priority level. Interface 32, in addition to sending the payload for a packet to pre-buffer 52 for temporary storage, sends the packet header to lookup module 44. Lookup module 44 determines the destination address or other keying information of the packet from the packet header and queries FIB 40 for a forwarding entry matching the destination address. A matching entry specifies the appropriate output port and the one of PFEs 30 of router 6 (identified by reference to a corresponding one of linecards 24) that includes the output port. As described above with respect to FIG. 2, when the appropriate output port is on a PFE 30 different than the receiving PFE 30, the receiving PFE 30 forwards the packet, including both the header and payload, and output port information to the designated outbound PFE 30 via switch fabric 28. In some embodiments, a PFE 30 translates the packet header into a packet context, which includes information typically found in a layer 3 header such as the source and destination IP addresses, protocol type, and payload type. In addition, the packet context may contain layer 2 information, for instance, the source and destination MAC address for the packet. In such embodiments, PFEs 30 and modules within PFEs 30 may exchange, for a particular packet, the packet context rather than the packet header.

To classify packets to a priority level, lookup module 44 determines one or more characteristics of the received packets and analyzes these characteristics with respect to various QoS guarantees. Typically, lookup module 44 determines the characteristics of the received packets from the packet headers, such as the IP or TCP header, but lookup module 44 may also analyze higher level protocol layers, such as the application layer, lower level protocol layers, or even the data payload. Lookup module 44 may then apply a set of policies (not shown) to the packet characteristics in order to classify each packet to the one or more priority levels.

PFE 30 further comprises buffer 42, queues 51 and queue manager 50. Buffer 42 receives packet payloads from pre-buffer 52 or from another PFE via switch fabric interface 33 and buffers the payloads until transmission by interface 32. In some embodiments, pre-buffer 52, rather than buffer 42, receives packet payloads from other PFEs via switch fabric interface 33. As described in detail below, the physical and/or virtual address space of buffer 42 is partitioned into a number of memory pages. Buffer 42 is typically a form of dynamic RAM (e.g., DRAM, SDRAM, DDR2 SDRAM, and the like) but may be another type of storage media. In some embodiments, buffer 42 is shared among the various PFEs 30 of router 6 as distributed buffer memory. In some embodiments, pre-buffer 52 is implemented as high-speed, on-chip memory within one or more packet forwarding integrated circuits, and buffer 42 is provided by off-chip DDR2 coupled to the packet forwarding integrated circuits by a data bus. In some embodiments, PFE 30 distributes packet buffering to pre-buffer 52 and buffer 42 as needed, depending on the current memory state.

Queues 51 are a set of priority queues that receives and store packets or references (e.g., a memory address pointer to a packet stored in buffer 42) to packets buffered for transmission. Queues 51 may include all queues necessary to support packets destined for interface 32. In some embodiments, each priority queue is associated with a particular priority level and a particular output port 58 on PFE 30. Accordingly, each of output ports 58 is associated with a subset of queues 51 that represents a full complement of the available priority levels for network 4. In some embodiments, queues 51 may comprise only one queue per output port.

Each of queues 51 receives references to packets classified to the corresponding priority level and associated one of output ports 58 and maintains those references in the order that they were received. In this manner, each of queues 51 implements the characteristic first-in-first-out (FIFO) functionality of a queue data structure.

Queue manager 50 performs scheduling, maintenance, and interface functions for queues 51. Queue manager 50 prioritizes and regulates the rate at which interface 32 services (i.e., transmits) packets referenced by the individual queues 51. Queue manager 50 may implement one or more scheduling algorithms that foster QoS, such as fair queuing, weighted fair queuing, weighted round robin, and the like, to make a scheduling determination. In addition, queue manager 50 maintains the occupancy of the individual queues 51 by implementing policies that specify the appropriate packet to be dropped when a queue overflows due to heavy traffic on the associated port. Such policies may specify a drop-from-front, drop-from-tail, active queue management, or some other queue management scheme.

Queue manager 50 receives references to packets and assigns the references to the appropriate one of queues 51 based on the appropriate output port and priority classification assigned to the packet.

Finally, queue manager 50 monitors both variable and static characteristics for each of queues 51 and responds to queries for this information from other modules in PFE 30. For example, queue manager 50 monitors, for each of queues 51, the current queue depth and the queue drain rate (i.e., the rate at which the packets referenced in the queue are transmitted). In general, a queue drain rate is affected by a number of individual factors, including the scheduling policy, the queue depths of the other queues in the priority set associated with the output port 58, the nature and burstiness of incoming traffic, the overflow drop policy, and other factors. Nevertheless, queue manager 50 monitors, for each of queues 51, the recent drain rate and the additional factors listed above to provide an approximation of the future drain rate.

Queue latency measures the time that passes between enqueuing an element on a queue and dequeuing the same element from the queue. Thus, the expected output queue latency measures the expected time that will pass between enqueuing a network packet on an output queue and dequeuing the network packet from the output queue. In general, for a packet, an expected output latency correlates to the expected output queue latency. In response to queries from other modules in PFE 30, queue manager 50 calculates the product of a current queue depth and the queue drain rate to provide an estimation of the expected output queue latency that will be experienced by a packet newly enqueued on a particular one of queues 51. In some embodiments, queue manager 50 employs more advanced algorithms or heuristics for determining the likely latency for a newly enqueued packet on particular one of queues 51. For example, queue manager 50 may measure the dequeue rate and/or enqueue rate of the queues and calculating an expected output queue latency based on either or both of these factors. As another example, queue manager 50 may track expected output queue latencies for each of queue 51 by marking certain packets enqueued in queues 51 and measuring the time to output for the marked packets.

Memory manager 48 performs maintenance and interface functions for buffer 42. Memory manager 48 implements a page-based memory system by partitioning the virtual and/or physical memory space of buffer 42 into N fixed-length blocks called pages. Typically, each page contains contiguous memory addresses for physical and/or virtual addressing. The number of pages, N, may depend on a variety of design factors, including the overall size of buffer 42 and the desired page size, which itself may depend on the architecture of a particular embodiment of the invention. For example, a single memory page may comprise two kilobytes of memory, but there may be 1M of such memory pages. In this example, therefore, the 1M pages collectively comprise two gigabytes of memory space.

Memory manager 48 maintains a pool of free memory pages (the "free pool") that are not presently being used to store packets. In response to requests for packet buffer memory, memory manager 48 allocates a page in the free pool and returns a reference to the page.

In the exemplary embodiment shown in FIG. 3, each page is itself divided into fixed-length blocks, or "chunks," where the size of each chunk corresponds to the size of a memory read/write operation to buffer 52 in order to take advantage of implementation-specific properties of buffer 52. A packet may span one or more chunks in a single page and may also overflow into chunks of additional pages. Conversely, a single page may store multiple packets, portions of packets, or some combination thereof.

When a single page stores multiple packets or portions thereof, the packets on the page may be referenced by different queues having divergent expected queue latencies. As explained above, when a packet referenced by a low-latency queue is transmitted, this leads to the unused space previously occupied by the transmitted packet remaining allocated and unusable until the remaining packets stored by the page are also transmitted. Once all packets stored by a page are transmitted and no longer needed by router 6, memory manager 48 returns the page to the free pool.

PFE 30 includes control module 46, which cooperates with lookup module 44, memory manager 48, and queue manager 50 to implement the lifetime-based memory management scheme described. Control module 46 defines a set of L lifetimes by partitioning the range of the possible queue latencies of queues 51. For example, where L=16, control module 46 may define sixteen ranges to encompass the possible queue latencies. Queue latency may conceivably range from 0 to infinity, thus the lifetime defining the longest range may be open-ended (to infinity). In some embodiments, queue manager 50 may set different bounds for the possible queue latencies.

Each lifetime defines a particular subrange of possible queue latencies. Control module 46 may partition the range into subranges using one of several methods. For example, the range may be divided into equal-length lifetimes (with high-length lifetime open-ended to account for infinity where relevant). As another example, control module 46 (or an administrator, not shown) may store and analyze the historic queue latency data and determine the probability distribution that describes the probability of a packet experiencing a particular queue latency prior to transmission. Control module 46 may then use the probability distribution to partition the range such that the probability of a packet experiencing a queue latency falling within a particular subrange is equal for all subranges. Each subrange, according to this method, would encompass a similar volume of packets.

The optimal number of L lifetimes is implementation-specific. Thus, various embodiments of control module 46 of PFE 30 may define more or fewer lifetimes, depending on such factors as the number of queues 51, the number of priority levels defined by network 4, the amount of available memory space, and other factors.

For each lifetime, control module 46 requests and receives a reference to a free memory page from memory manager 48. Control module 46 assigns the received page for a particular lifetime as the open page for the lifetime, that is, the page to which future received packets assigned to that lifetime are to be written. Control module 46 maintains the referenced memory space in the open page in a lifetime page pointers 72 data structure (illustrated in FIG. 4). Each of the elements in lifetime page pointers 72 corresponds to one of the L lifetimes defined by control module 46 and holds a reference to memory space in the open memory page for that lifetime. In some embodiments, control module 46 requests, receives, and maintains multiple open pages for each lifetime in order to distribute packet storage in buffer 42.

As already described, lookup module 44, upon receiving a packet header from interface 32, determines the appropriate output port and classifies the corresponding packet to a priority level. Lookup module 44 sends the port and classification information to queue manager 50 and requests the expected queue latency for the one of queue 51 both associated with the port and assigned the priority level corresponding to the classification. Queue manager 50 calculates the expected queue latency according to the process described above and responds to lookup module 44 with the value. Lookup module 44 sends the expected queue latency for the packet, along with the packet header, to control module 46. In instances where the output port is located on another one of PFEs 30, lookup module 44 queries the queue manager of the other PFE and sends the expected queue latency for the packet and the packet to the control module of the other PFE. The other PFE then assumes responsibility for future packet processing, which proceeds as described below. In some embodiments, control module 46 or another module, rather than lookup module 44, queries queue manager 50 for the expected queue latency of the packet.

In VOQ-based embodiments, lookup module 44 queries queue manager 50 even in instances where the output port is located on another one of PFEs 30, for buffer 42 will store the packets in accordance with the ingress-buffering techniques for implementing virtual output queuing.

Control module 46 assigns the packet to a lifetime based on the expected queue latency for the packet and the various lifetime ranges that control module 46 defines. In some embodiments, queue manager 50 and control module 46 cooperate to assign each one of queues 51 to a particular lifetime based on fixed characteristics of the queue. For example, queue manager 50 and control module 46 may group and assign low-priority queues to one lifetime, while grouping and assigning high-priority queues to another lifetime. In such embodiments, queue manager 50 and control module 46 may avoid determining variable characteristics of individual ones of queues 51 in favor of a simple mapping function from a queue to a lifetime.

Control module 46 then transfers the packet from pre-buffer 52 to buffer 42, writing it to the open memory page referenced in the element in lifetime page pointers 72 that corresponds to the packet lifetime. In instances where the packet is received by an interface associated with another PFE of router 6, control module 46 transfers the packet across switch fabric 28 from the pre-buffer of the other PFE to buffer 42 of PFE 30 via switch fabric interface 33 according to a similar process. In some embodiments, pre-buffer 52 of PFE 30 receives the packet from the pre-buffer of the other PFE, rather than buffer 42.

Control module 46 tracks chunk occupancy in a page, i.e., those chunks in a page being used to store packet data. During a packet write operation to buffer 42, control module 46 manages packet data directed to PFE 30 via switch fabric 28 and, in instances where interface 32 is the receiving interface, transfers packets from pre-buffer 52. Control module 46 writes packet data, one chunk at a time, to the remaining unoccupied chunks of the open memory page assigned to the packet lifetime. When control module 46 determines that there are no remaining open chunks in the open memory page, control module 46 requests and receives a reference to another free memory page from memory manager 48. If additional packet data remains, control module 46 writes the additional packet data to the new open memory page assigned to the packet lifetime.

Memory pages for buffer 42 may be larger than a minimum packet size. As a result, control module 46 may write multiple packets having the same lifetime to a single memory page. In this manner, PFE 30 decreases, for each memory page, the standard deviation of the distribution representing the likely differences between transmission times for packets stored by the page. Because the packets on a memory page are likely to be transmitted at similar times, the memory page may not retain unusable space for a long period, thereby leading to better utilization of buffer 42. Utilization is proportional to the number of lifetimes, L, defined by control module 46.

After writing a packet to a memory page of buffer 42, control module 46 sends to queue manager 50 a reference to the memory location of the packet in the buffer 42 address space. In conjunction with the reference, control module 46 sends queue manager 50 the output port and classification information for the packet. Queue manager 50 receives and assigns the reference to the appropriate one of queues 51 based on the output port and classification information. In some embodiments, lookup module 44 does not classify packets by priority level. In such embodiments, control module 46 does not send queue manager 50 classification information for the packet, and queue manager 50 assigns the reference to the appropriate one of queues 51 based on the output port.

Figure 4:
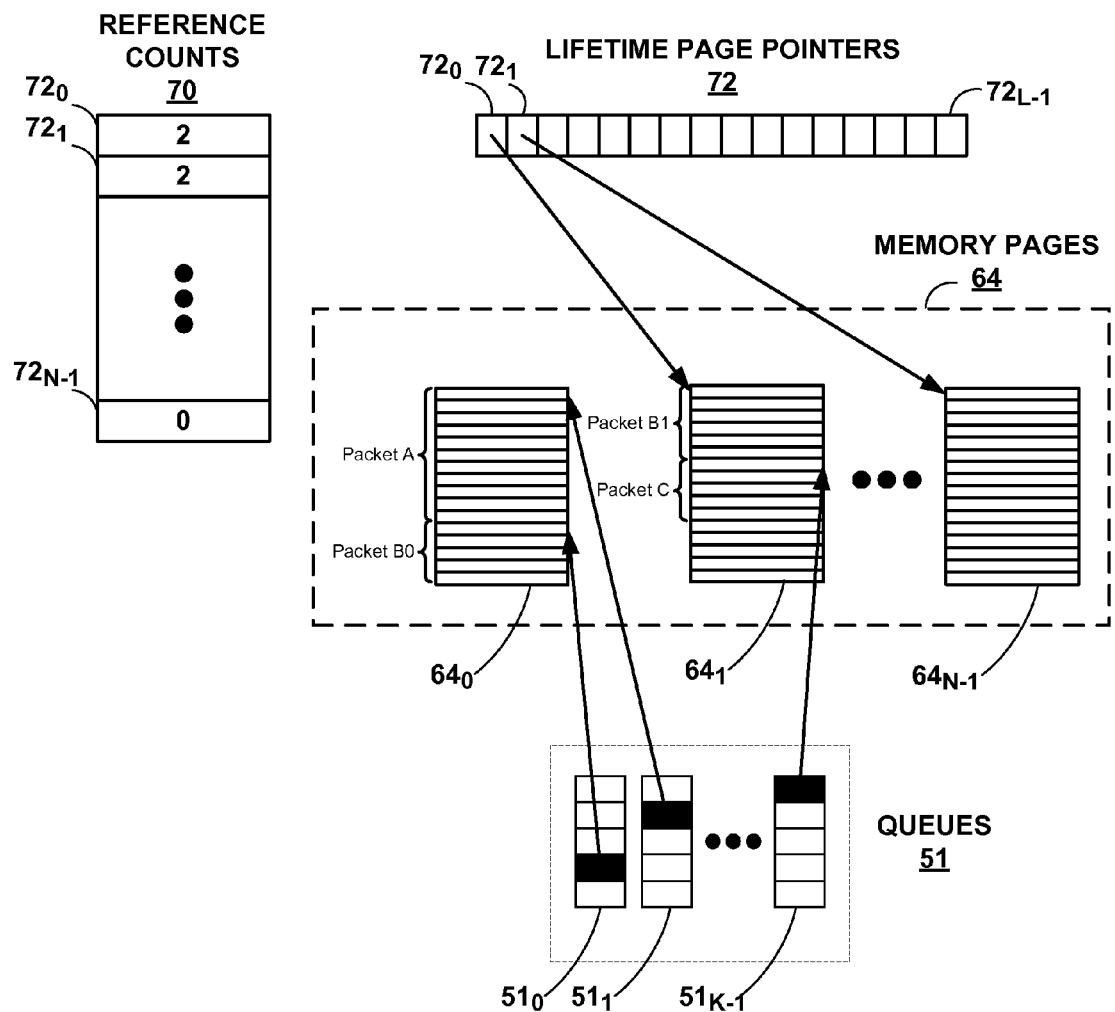
FIG. 4 is a block diagram illustrating exemplary data structures used to implement the techniques described herein.

Control module 46 further includes a reference counts 70 data structure (illustrated in FIG. 4). For each memory page, reference counts 70 includes a reference count value recording the number of references to any packet, stored by the memory page, held in queues 51.

Control module 46 and queue manager 50 coordinate to adjust reference count values upon the following events. Control module 46 increments the corresponding reference count for a memory page in reference counts 70 upon sending a reference to a packet stored by the memory page to queue manager 50 for enqueuing on queues 51. Queue manager 50 directs control module 46 to decrement the corresponding reference count for a memory page when a packet stored by the memory page is transmitted by interface 32 after being scheduled for transmission by queue manager 50. Similarly, queue manager 50 directs control module 46 to decrement the corresponding reference count for a memory page when the reference to a packet stored by the memory page is dropped from one of queues 51 by queue manager 50 because of traffic congestion or other factors.

Interface 32 may also receive multicast packets on input ports 56. A multicast packet specifies a multicast group address as a destination address. Network 4, which includes router 6 and PFE 30, constructs a multicast distribution tree from network nodes to efficiently transmit multicast packets from a source node to member nodes of the multicast group specified by a multicast group address. In some instances, router 6 lies on a branch of a multicast distribution tree. Accordingly, router 6 must replicate a received multicast packet and send, via the appropriate output ports 58, a packet replica to each of the multiple downstream devices that are downstream neighbors on the branch routes.

Interface 32 sends a received multicast packet payload to pre-buffer 52 and the associated multicast packet header to lookup module 44, which reads the multicast group address from the header and passes the multicast group address to routing engine 26. Routing engine 26 responds with a list of destination addresses of downstream neighbors that lie on a route to member nodes of the multicast group, where the multicast group is associated with the multicast group address. For each address in the list of destination addresses, lookup module 44 consults FIB 40 to determine the appropriate output port for the address and further classifies the multicast packet, with respect to the appropriate output port, to a priority level. Lookup module 44 queries queue manager 50 with this information, which responds with an expected queue latency.

After querying queue manager 50 with the output port and priority classification for every destination address for the multicast packet, lookup module 44 sends the received expected queue latencies for the packet (one for each of the destination addresses), together with the multicast packet header, to control module 46. Control module 46 assigns the multicast packet to a lifetime based on the worst (i.e., the longest) of the expected queue latencies for the multicast packet and the various lifetime ranges that control module 46 defines. The multicast packet lifetime, therefore, is the longest expected lifetime for the packet. In some embodiments, control module 46 categorizes a multicast packet to a lifetime on a different basis.

Upon assigning the multicast packet to a lifetime, control module 46 transfers the multicast packet from pre-buffer 52 to buffer 42, writing it to the open memory page referenced in the element that corresponds to the assigned multicast packet lifetime in lifetime page pointers 72. Control module 46 then sends to queue manager 50 a reference to the memory location of the packet in the buffer 42 address space. In conjunction with the reference, control module 46 sends queue manager 50 the output port and priority classification pair for each address in the list of destination addresses. Accordingly, queue manager 50 receives and assigns the reference to multiple appropriate ones of queues 51 based on the various output port and priority classification pairs that correspond to the destination addresses for the multicast packet. In some embodiments, lookup module 44 does not classify packets by priority level. In such embodiments, control module 46 does not send queue manager 50 classification information for the packet, and queue manager 50 assigns the references to the appropriate ones of queues 51 based on the output port.

Control module 46 maintains reference counts 70 with respect to multicast packets as well as unicast packets. As described above, control module 46 increments the corresponding reference count for a memory page in reference counts 70 for each reference, in queues 51, to a packet stored by the memory page. For multicast packets, there may be multiple references in one or more of queues 51 to a single multicast packet stored by a memory page, which causes corresponding increases in the reference count for the memory. In addition, the reference count tracks the number of references to additional packets stored by the memory page. In some instances, fragments of a single packet may be distributed across multiple. In such instances, the reference count tracks the number of references to the packet fragments.

Queue manager 50 dequeues references to multicast packet, reads the packet data stored at the reference, and sends replicas of the packet to interface 32 for transmission via output ports 58. As with unicast packets, when interface 32 transmits a multicast packet or drops a reference to the packet in one of queues 51, queue manager 50 directs control module 46 to decrement the appropriate reference count in reference counts 70.

In some instances, the number of references to a memory page that includes a multicast packet may exceed the numeric capacity of the corresponding reference count. For example, where a reference count in reference counts 70 is a 6-bit value, more than sixty-three references will overflow the reference count. In such instances, control module 46 replicates a multicast packet having excessive destinations and disperses multiple copies of the packet to multiple memory pages. Control module 46 then, for each destination, associates the corresponding output port and priority classification pair with a reference to the multicast packet data stored by one of the memory pages and sends this information to queue manager 50. Queue manager 50 enqueues the reference on the appropriate one of queues 51 based on the output port and priority classification.

In some embodiments, control module 46 orders the output port and priority classification pair by expected queue latency and arranges the pairs into one or more groups. Control module 46 then associates each pair with a different one of the memory pages containing a copy of the packet. In other words, control module 46 first groups comparatively faster ones of queues 51 and comparatively slower ones of queues 51, then control module 46 associates the faster group with one memory page that contains a copy of the multicast data and associates the slower group with another memory page that also contains a copy of the multicast data. For example, where a reference count is a 6-bit value as described above, control module 46 may determine the sixty-three pairs with the shortest expected queue latency and associate these pairs with a reference to the multicast data stored by one of the memory pages. Then, control module 46 may determine the sixty-three pairs with the next-shortest expected queue latency and associate these pairs with a reference to the multicast data stored by another one of the memory pages. Control module 46 continues this process until all of the pairs are associated with a reference. Finally, for each pair, control module 46 sends the output port, priority classification, reference information to queue manager 50, which assigns the reference to the appropriate one of queues 51. Ordering and grouping the output port and priority classification pairs in this manner may increase memory utilization by decreasing the distribution, among references to the multicast packet stored by a particular memory page, representing the likely differences between transmission times for the multicast packet to the various destinations represented by the references.

Queue manager 50 schedules a packet for transmission on one of output ports 58 according to a scheduling process that determines the appropriate one of queues 51 associated the output port to service. Queue manager 50 dequeues the packet reference at the head of the appropriate queue and provides the reference to interface 32, which reads the packet data at the referenced memory address in buffer 42 and sends the packet data to the output port for transmission. For unicast packets, memory manager 48 deletes the memory space in the corresponding memory page formerly occupied by the transmitted packet. For multicast packets, the packet data remains allocated until the queue manager 50 dequeues the final remaining reference to the packet data and provides the reference to interface 32.

After a dequeue operation, queue manager 50 additionally directs control module 46 to decrement the appropriate reference count in reference counts 70. When the reference count for an allocated memory page reaches zero, there are no remaining references in queues 51 to any packets stored by the memory page. Control module 46 therefore directs memory manager 48 to return the page to the free pool for future use.

PFE 30 includes hardware, firmware and or software, and may include discrete hardware circuitry such as application-specific integrated circuits (ASICs), as well as processors, control units, or other logic for executing software instructions fetched from computer-readable media. Examples of such media include hard disks, flash memory, random access memory (RAM), read-only memory (ROM), non-volatile random access memory (NVRAM), electrically erasable programmable read-only memory (EEPROM), flash memory, and the like.

The lifetime-based memory paging and packet allocation scheme implemented by PFE 30 decreases, for each memory page, the standard deviation of the distribution representing the likely differences between transmission times for packets stored by the page. Because the packets on a memory page are more likely to be transmitted at similar times than with conventional packet allocation schemes, unusable memory space is promptly returned to the free pool, thereby leading to better utilization of buffer 42.

FIG. 4 is a block diagram illustration exemplary relationships among exemplary data structures maintained and used by certain modules of PFE 30 in FIG. 3. The exemplary data structures include memory pages 64, queues 51, lifetime page pointers 72, and reference counts 70.

Memory pages 64 illustrate the N memory pages of buffer 42. Each of memory pages 64 comprises sixteen chunks with which to store packet data. In the example configuration of memory pages 64, memory page $64_0$ stores packet data for two packets: packet A and a first portion of packet B. Similarly, memory page $64_1$ stores packet data for two packets: the remaining portion of packet B and packet C. In some instances, the packets are distributed across memory pages $64_0$ and $64_1$.

Queues 51 illustrate, in further detail, an exemplary configuration of queues 51 of FIG. 3. Queues 51 include K queues. Each of queues 51 is associated with a particular output port and a particular priority level. Queues 51 highlight certain elements of the K queues that include references to the memory location of packet data stored by memory pages 64. For example, queue $51_0$ includes a reference to packet A in memory page $64_0$.

Lifetime page pointers 72 include elements that correspond to one of the L lifetimes defined by control module 46 and store a reference to memory space in the open memory page for that lifetime. For simplicity, only a subset of references held in lifetime page pointers 72 is illustrated. In the example of FIG. 4, lifetime page pointer $72_0$ corresponding to lifetime zero holds a reference to memory page $64_1$. Memory page $64_1$ has free chunks remaining. As described above with respect to FIG. 3, if memory page $64_1$ has additional packet data written that fills all of the chunks, control module 46 of PFE 30 assigns a new one of memory pages 64 from the free pool to lifetime zero. In embodiments that maintain a set of open pages for each lifetime, each of lifetime page pointers 72 may comprise multiple pointers, or another data structure, that enables control module 46 to reference the open pages.

Finally, reference counts 70 stores, for each of memory pages 64, the number of references in queues 51 to any packet stored by the memory page. Reference count $70_0$ stores the number of references to memory page $64_0$, reference count $70_1$ stores the number of references to memory page $64_1$, and so on. In the example of FIG. 4, reference count $70_0$ has a value of two to account for references in queues 51 to packet A and packet B in memory page $64_0$. Reference count $70_1$ also has a value of two to account for references in queues 51 to packet B, which is stored in part on memory page $64_1$, and to packet C.

Figure 5:
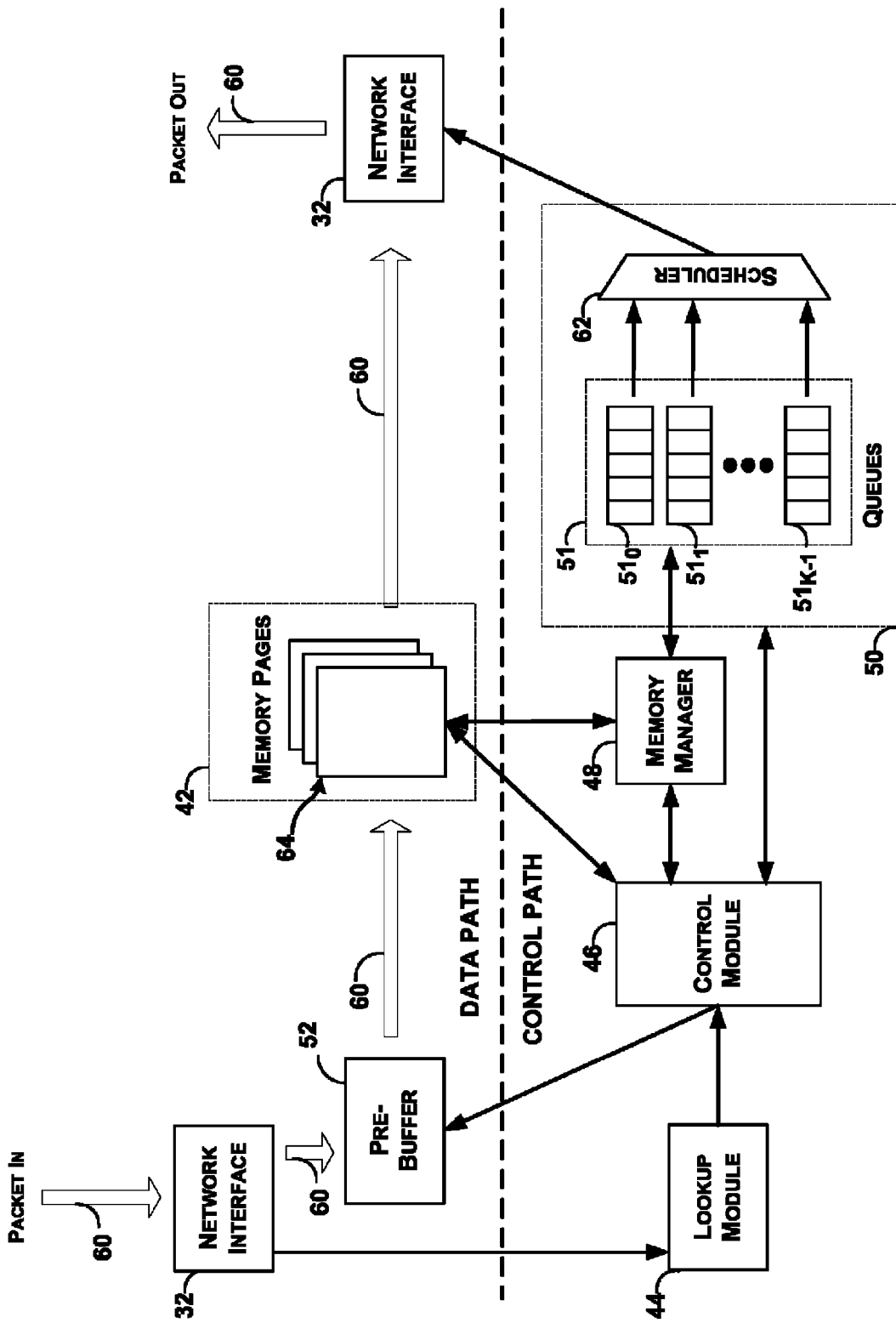
FIG. 5 is a block diagram illustrating a conceptual representation of the movement of data and control information according to the techniques described herein.

FIG. 5 is a conceptual diagram illustrating the movement of packet data and control information within PFE 30 in accordance with the techniques described in this disclosure. FIG. 5 illustrates selected components and data structures of PFE 30.

In general, packet data follows the data path illustrated by arrows 60. As packets are received from by a network interface 32, data for the packets are written to pre-buffer 52, then to the memory pages 64 of buffer 42, and finally to a network interface 32 for transmission.

Modules in the control path manage control information to implement the techniques of this disclosure. Upon packet receipt, network interface 32 sends packet header information to lookup module 44, which determines the appropriate output port and priority classification for the packet and sends this packet information to control module 46. Control module 46 queries queue manager 50 with the packet information to obtain an expected queue latency.

Memory manager 48 controls the allocation and deallocation of memory pages 64. Control module 46 receives free ones of memory pages from memory manager 48 and associates the free memory pages to lifetimes as needed. Using the expected queue latency for a packet received from queue manager 50, control module 46 assigns the packet to a lifetime and writes the packet data to the associated memory page. Control module 46 then passes a reference to the packet data in the memory page to queue manager 50, which enqueues the reference on the appropriate one of queues 51.

Queue manager 50 includes scheduler 62, which performs the packet scheduling functions for each output port. Scheduler 62 services the next-scheduled ones of queues 51 by dequeuing a packet reference and sending the reference to a network interface 32. Network interface 32 uses the reference to read the packet data from memory pages 64 in buffer 42 as a prerequisite to packet transmission. Queue manager 50 informs control module 46 that the transmitted packet is no longer referenced by the dequeued one of queues 51. Control module 46 may thereafter direct memory manager 48 to free the memory page 64 that stores the packet if there are no further references in queues 51 to packets stored by the memory page 64.

Figure 6:
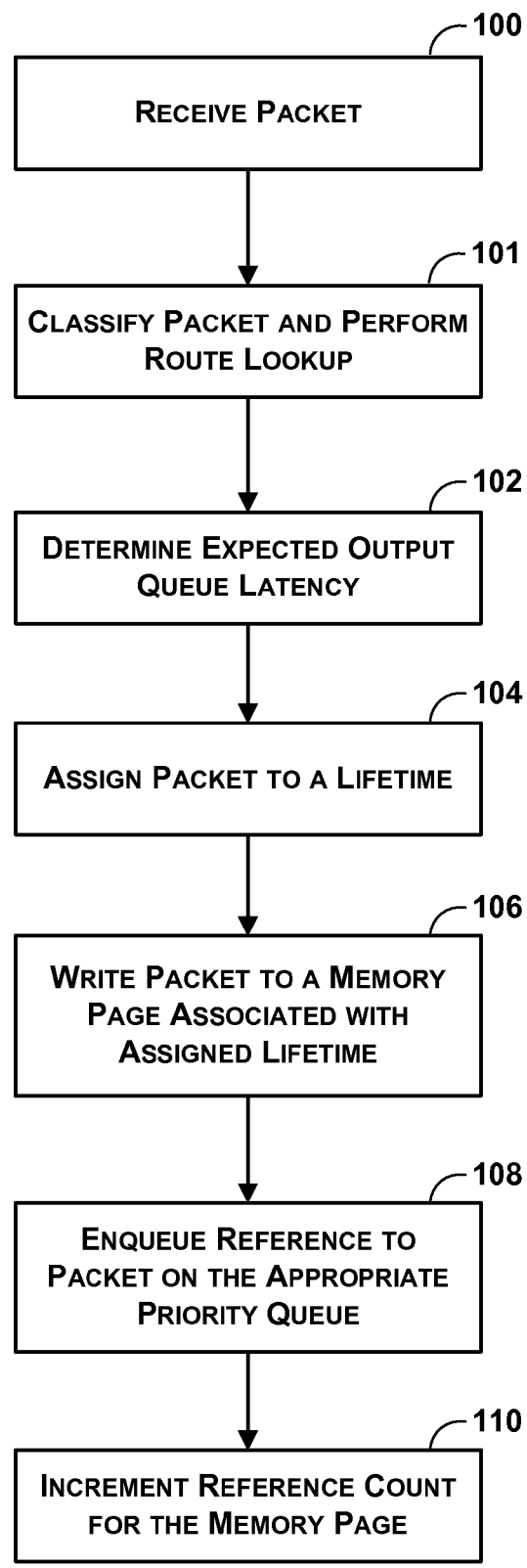
FIG. 6 is a flowchart illustrating an example mode of operation for buffering a packet in accordance with the techniques described herein.

FIG. 6 is a flowchart illustrating an example mode of operation, for the exemplary packet forwarding engine 30 of FIG. 3, for buffering a packet within a packet lifetime-based memory allocation system. In some embodiments, the illustrated steps may be performed in a different order, or particular steps may be performed concurrently.

Initially, network interface 32 receives a packet (100). Lookup module 44 analyzes the packet header to classify the packet to a priority level and, additionally, queries FIB 44 to perform a route lookup and thus determine the appropriate output port for the packet (101). Next, lookup module 44 requests, from queue manager 50, the expected queue latency for the packet based on the priority level and output port (102).

Based on the expected queue latency for the packet, lookup module 44 assigns the packet to the lifetime having a transmission delay range that encompasses the expected queue latency and sends the packet to control module 46 (104). Control module 46 buffers the packet data to the open memory page associated with the assigned lifetime (106) while retaining a memory reference to the packet data buffered by the memory page. Control module 46 sends the memory reference to queue manager 50, which enqueues the reference onto the appropriate one of queues 51 (108). Finally, control module 46 increments the reference count for the open memory page (110).

Figure 7:
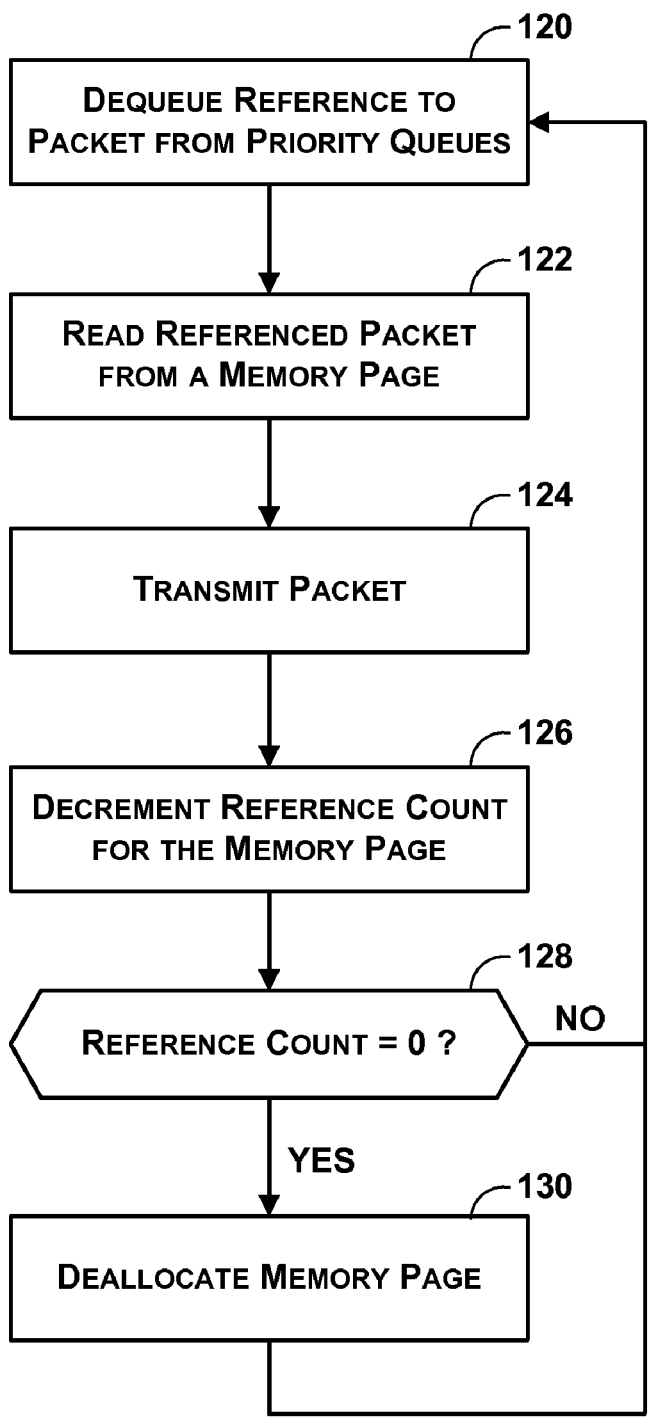
FIG. 7 is a flowchart illustrating an example mode of operation for transmitting a packet in a manner consistent with the principles of the invention.

FIG. 7 is a flowchart illustrating an example mode of operation, for the exemplary packet forwarding engine 30 of FIG. 3, for transmitting a packet within a packet lifetime-based memory allocation system. In some embodiments, the illustrated steps may be performed in a different order, or particular steps may be performed concurrently.

First, queue manager 50 dequeues a reference to the packet to be transmitted from one of queues 51 (120). The reference comprises a memory reference to memory space occupied by the packet. Queue manager 50 reads the packet data from a memory page that comprises the memory reference (122) and sends the packet data to a network interface 32 for transmission (124). Upon receiving notification of the transmission, control module 46 decrements the reference count for the memory page that held the packet data (126). Control module 46 next determines whether any additional references held in queues 51 reference packets held by the memory page by checking the reference count (128). If additional references remain, the operation reinitializes (NO branch of 128). Otherwise, if there are no additional references (YES branch of 128), control module 46 directs memory manager 48 to deallocate the memory page and return it to the memory page free pool for future use (130).

Various embodiments of the invention have been described. These and other embodiments are within the scope of the following claims.

The invention claimed is:

1. A method comprising:
  receiving an incoming network packet with a network device; and
  assigning, with the network device, the network packet to a first one of a plurality of lifetimes maintained by the network device, wherein each lifetime in the plurality of lifetimes defines a different subrange within a range of possible output queue latencies for a plurality of output queues of the network device; and
  buffering the network packet to a first one of a plurality of memory pages based on the first lifetime to which the network packet was assigned, wherein each of the plurality of memory pages comprises a block of contiguous memory address space of the network device.

2. The method of claim 1, further comprising:
  determining, from among the plurality of output queues, an appropriate output queue for the network packet, wherein the appropriate output queue for the network packet is a first output queue; and
  determining an expected output queue latency for the network packet, wherein the expected output queue latency measures the expected time that will pass between enqueuing the network packet on the first output queue and dequeuing the network packet from the first output queue.

3. The method of claim 2, wherein assigning the network packet to the first one of the plurality of lifetimes comprises assigning the network packet to the first one of a plurality of lifetimes based on the expected output queue latency for the network packet.

4. The method of claim 2, further comprising:
  determining an output port for the network packet,
  wherein determining the first output queue for the network packet comprises determining the first output queue for the network packet based on the output port for the network packet.

5. The method of claim 2, further comprising:
  classifying the network packet to a priority level,
  wherein determining an appropriate output queue for the network packet comprises determining an appropriate output queue for the network packet based on the priority level for the network packet.

6. The method of claim 2, where determining the expected output queue latency for the network packet comprises measuring a depth of the first output queue.

7. The method of claim 2, where determining the expected output queue latency for the network packet comprises measuring a drain rate of the first output queue.

8. The method of claim 2, further comprising:
  receiving a subsequent incoming network packet with the network device;
  determining, from among the plurality of output queues, an appropriate output queue for the subsequent network packet, wherein the appropriate output queue for the subsequent network packet is a second output queue that is different than the first output queue;
  assigning, with the network device, the subsequent network packet to the first lifetime; and
  buffering the subsequent network packet to the first memory page based on the first lifetime to which the subsequent network packet was assigned.

9. The method of claim 1, further comprising assigning the first memory page to the first lifetime.

10. The method of claim 1, further comprising enqueuing, on one of the plurality of output queues, a reference to the memory location of the network packet on the first memory page.

11. The method of claim 1, further comprising:
  receiving a subsequent incoming network packet with the network device;
  assigning, with the network device, the subsequent network packet to a second one of the plurality of lifetimes maintained by the network device; and
  buffering the subsequent network packet to a second one of the plurality of memory pages based on the second lifetime to which the subsequent network packet was assigned.

12. The method of claim 1, further comprising:
  receiving a subsequent incoming network packet with the network device;
  assigning, with the network device, the subsequent network packet to the first lifetime; and
  buffering the subsequent network packet to the first memory page based on the first lifetime to which the subsequent network packet was assigned.

13. The method of claim 1, wherein each of the plurality of memory pages has a corresponding reference count, and further comprising incrementing a reference count for the first memory page.

14. The method of claim 1, wherein each of the plurality of memory pages has a corresponding reference count, and further comprising:
  deleting the network packet from the first memory page; and
  decrementing a reference count for the first memory page.

15. The method of claim 14, further comprising:
  determining whether the reference count for the first memory page is zero; and
  returning the first memory page to a memory page free store when the reference count is zero, wherein the memory page free store comprises the memory pages in the plurality of memory pages that are not assigned to one of the plurality of lifetimes.

16. The method of claim 1, wherein the network packet is a multicast packet, and further comprising:
  determining, from among the plurality of output queues, appropriate output queues for the network packet, wherein the appropriate output queues are associated with the intended multicast destinations specified by the network packet; and
  determining expected output queue latencies for the network packet, wherein the expected output queue latencies measure, for each of the appropriate output queues, the expected time that will pass between enqueuing the network packet on an output queue and dequeuing the network packet from the output queue,
  wherein assigning the network packet to a first one of a plurality of lifetimes comprises assigning the network packet to a first one of a plurality of lifetimes based on the longest expected output queue latency for the network packet.

17. The method of claim 1, wherein the network packet is a multicast packet, and further comprising:
  determining, from among the plurality of output queues, appropriate output queues for the network packet, wherein the appropriate output queues are associated with the intended multicast destinations specified by the network packet; and
  determining expected output queue latencies for the network packet, wherein the expected output queue latencies measure, for each of the appropriate output queues, the expected time that will pass between enqueuing the network packet on an output queue and dequeuing the network packet from the output queue;

arranging the appropriate output queues into a first and second group based on the expected output queue latencies for the appropriate output queues, wherein assigning the network packet to a first one of a plurality of lifetimes comprises assigning the network packet to the first lifetime based on the longest expected queue latency among the appropriate output queues in the first group;

assigning the network packet to a second one of a plurality of lifetimes based on the longest expected queue latency among the appropriate output queues in the second group;

buffering the network packet to a first one of a plurality of memory pages based on the first lifetime to which the network packet was assigned, wherein each of the plurality of memory pages comprises a block of contiguous memory address space of the network device; and buffering the network packet to a second one of a plurality of memory pages based on the second lifetime to which the network packet was assigned.

18. The method of claim 1, wherein the network packet is a multicast packet, and further comprising:

buffering the network packet to a first one of a plurality of memory pages based on the first lifetime to which the network packet was assigned, wherein each of the plurality of memory pages comprises a block of contiguous memory address space of the network device, and wherein each of the plurality of memory pages has a corresponding reference count;

determining whether a number of intended multicast destinations specified by the network packet exceeds a numeric capacity of a reference count for the first memory page; and buffering the network packet to a second one of a plurality of memory pages when the number of intended multicast destinations exceeds the numeric capacity.

19. The method of claim 1, further comprising:

partitioning the range of possible output queue latencies for the plurality of output queues into a plurality of subranges; and assigning a subrange in the plurality of subranges to each of the plurality of lifetimes.

20. The method of claim 19, further comprising:

storing queue latency data representing queue latencies for previously processed network packets;

generating, from the queue latency data, a probability distribution that describes the probability of the network packet experiencing a particular queue latency, where partitioning the range of possible output queue latencies for the plurality of output queues into a plurality of subranges comprises partitioning the range of possible output queue latencies based on the probability distribution.

21. A router comprising:

a plurality of output queues;

a plurality of memory pages wherein each of the plurality of memory pages comprises a block of contiguous memory address space;

a plurality of lifetimes, wherein each lifetime in the plurality of lifetimes defines a different subrange within a range of possible output queue latencies for the plurality of output queues;

an interface that receives an incoming network packet; and a memory module, wherein the memory module assigns the network packet to a first one of the plurality of lifetimes, and wherein the memory module buffers the network packet to a first one of a plurality of memory pages based on the first lifetime to which the network packet was assigned.

22. The router of claim 21, further comprising:

a lookup module, wherein the lookup module determines, from among the plurality of output queues, an appropriate output queue for the network packet, wherein the appropriate output queue for the network packet is a first output queue, and wherein the lookup module determines an expected output queue latency for the network packet, wherein the expected output queue latency measures the expected time that will pass between enqueuing the network packet on the first output queue and dequeuing the network packet from the first output queue, and wherein the memory manager assigns the network packet to the first one of the plurality of lifetimes based on the expected output queue latency for the network packet.

23. The router of claim 22, wherein the interface receives a subsequent incoming network packet, wherein the lookup module determines, from among the plurality of output queues, an appropriate output queue for the subsequent network packet, wherein the appropriate output queue for the subsequent network packet is a second output queue that is different than the first output queue, wherein the memory module assigns the network packet to the first lifetime and buffers the subsequent network packet to the first memory page based on the first lifetime to which the subsequent network packet was assigned.

24. The router of claim 22, wherein the interface receives a subsequent incoming network packet, wherein the lookup module determines, from among the plurality of output queues, an appropriate output queue for the subsequent network packet, wherein the appropriate output queue for the subsequent network packet is a second output queue that is different than the first output queue, wherein the memory module assigns the network packet to a second one of the plurality of lifetimes maintained by the network device and buffers the subsequent network packet to a second one of the plurality of memory pages based on the second lifetime to which the subsequent network packet was assigned.

25. The router of claim 22, wherein the interface receives a subsequent incoming network packet, wherein the lookup module determines, from among the plurality of output queues, an appropriate output queue for the subsequent network packet, wherein the appropriate output queue for the subsequent network packet is the first output queue, wherein the memory module assigns the network packet to a second one of the plurality of lifetimes maintained by the network device and buffers the subsequent network packet to a second one of the plurality of memory pages based on the second lifetime to which the subsequent network packet was assigned.

26. The router of claim 21, wherein the memory module assigns the first memory page to the first lifetime.

27. A computer-readable storage medium comprising instructions for causing a programmable processor to:

receive, with a network device, an incoming network packet;

assign, with the network device, the network packet to a first one of a plurality of lifetimes maintained by the network device, wherein each lifetime in the plurality of lifetimes defines a different subrange within a range of possible output queue latencies for a plurality of output queues of the network device;

buffer the network packet to a first one of a plurality of memory pages based on the first lifetime to which the network packet was assigned, wherein each of the plurality of memory pages comprises a block of contiguous memory address space of the network device.

* * * * *